(12) United States Patent
Yamada et al.

(10) Patent No.: US 10,218,008 B2
(45) Date of Patent: Feb. 26, 2019

(54) FUEL CELL SYSTEM

(71) Applicant: TOYOTA JIDOSHA KABUSHIKI KAISHA, Toyota-shi, Aichi-ken (JP)

(72) Inventors: Takashi Yamada, Hekinan (JP); Hiroyuki Imanishi, Toyota (JP); Yohei Okamoto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 635 days.

(21) Appl. No.: 14/928,229

(22) Filed: Oct. 30, 2015

(65) Prior Publication Data
US 2016/0133956 A1  May 12, 2016

(30) Foreign Application Priority Data
Nov. 12, 2014  (JP) ................. 2014-230188

(51) Int. Cl.
H01M 8/04029   (2016.01)
H01M 8/0432    (2016.01)
H01M 8/04746   (2016.01)

(52) U.S. Cl.
CPC ... *H01M 8/04029* (2013.01); *H01M 8/04358* (2013.01); *H01M 8/04768* (2013.01)

(58) Field of Classification Search
CPC ................................. H01M 8/04029
See application file for complete search history.

(56) References Cited

U.S. PATENT DOCUMENTS

| 6,087,028 A * | 7/2000 | Goto ................ H01M 8/04029 429/435 |
| 6,186,254 B1 * | 2/2001 | Mufford ............ H01M 8/04029 429/442 |
| 2002/0051900 A1 * | 5/2002 | Okamoto .......... H01M 8/04029 429/442 |
| 2007/0218328 A1 * | 9/2007 | Osada ............... H01M 8/04014 429/430 |
| 2014/0080024 A1 | 3/2014 | Igarashi et al. |

FOREIGN PATENT DOCUMENTS

JP       2014-60068      4/2014

* cited by examiner

Primary Examiner — Sarah A. Slifka
Assistant Examiner — Brian R Ohara
(74) Attorney, Agent, or Firm — Finnegan, Henderson, Farabow, Garrett & Dunner, LLP

(57) ABSTRACT

A fuel cell system includes: a fuel cell; a coolant circulation passage; a radiator; a water pump; a flow dividing valve; a fan; and a controller that, when a first prescribed period elapses in a state where a temperature of a coolant is equal to or more than a first prescribed temperature and an opening degree of the flow dividing valve makes the flow rate of the coolant flowing into the radiator equal to or more than a prescribed flow rate, gives a priority to the rise in a driving voltage of the fan over the increase in a flow rate by the water pump, and when a second prescribed period elapses in a state where the temperature of the coolant is equal to or more than a second prescribed temperature after the driving voltage of the fan is raised, increases the flow rate by the water pump.

9 Claims, 7 Drawing Sheets

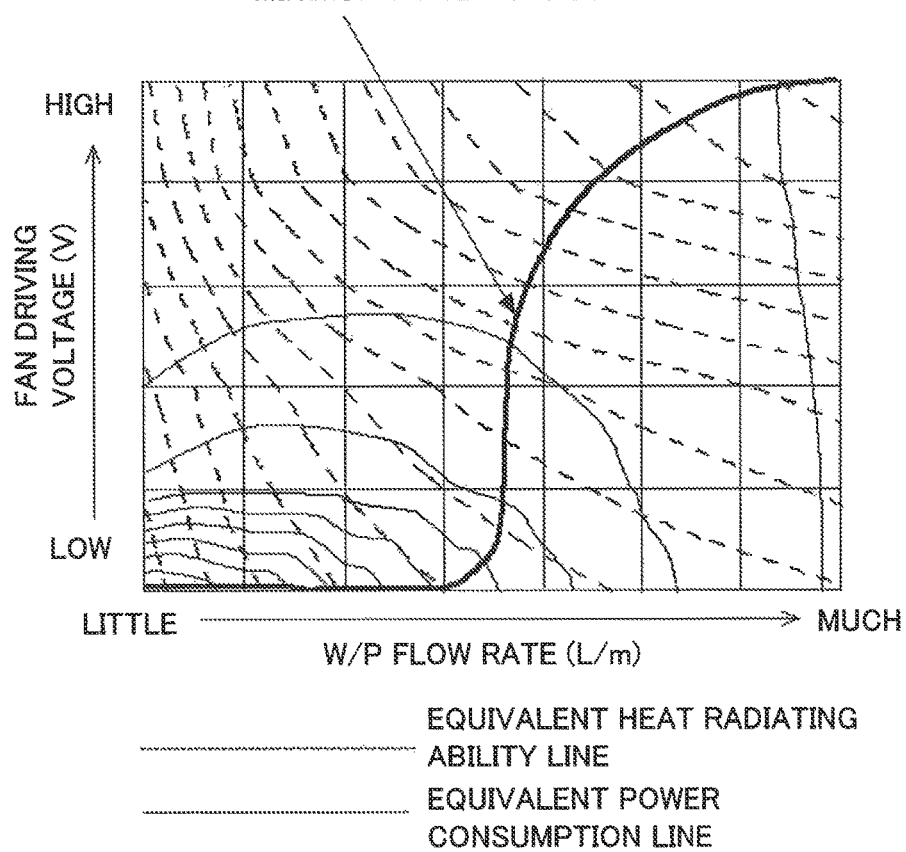

FUEL CELL SYSTEM

CROSS-REFERENCE TO RELATED APPLICATION

This application is based upon and claims the benefit of priority of the prior Japanese Patent Application No. 2014-230188, filed on Nov. 12, 2014, the entire contents of which are incorporated herein by reference.

FIELD OF THE INVENTION

The present invention relates to a fuel cell system.

BACKGROUND

Conventionally, there is proposed a power supply system in which power generation is performed by a fuel cell installed in a vehicle and an electric power is supplied to a household electrical appliance, i.e., the power supply system which performs so-called external power feeding. For example, Japanese Laid-Open Patent Publication No. 2014-060068 (hereinafter referred to as "Patent Document 1") proposes a technique that detects a dry state of the fuel cell during the external power feeding, and drives a radiator fan to avoid a so-called dry-up state when the fuel cell is in the dry state.

By the way, it is considered that, when the external power feeding is performed by the fuel cell installed in the vehicle, the vehicle is in a stop state, so that a traveling wind cannot be introduced into the radiator and the fuel cell cannot be cooled appropriately. A power supply system disclosed in the Patent Document 1 sends a wind to the radiator by driving a fan, and hence can cool the fuel cell. However, an electric power is consumed by the drive of the fan. In this respect, the power supply system disclosed in the Patent Document 1 has room for improvement.

SUMMARY OF THE INVENTION

It is an object of the present invention to provide a fuel cell system that effectively cools a fuel cell performing external power feeding.

According to an aspect of the present invention, there is provided a fuel cell system including: a fuel cell that performs an external power feeding; a coolant circulation passage through which a coolant cooling the fuel cell circulates; a radiator mounted on the coolant circulation passage; a water pump that circulates a coolant in the coolant circulation passage; a flow dividing valve that controls a flow rate of the coolant flowing through the radiator; a fan that sends an air to the radiator; and a controller that. When a first prescribed period elapses in a state where a temperature of the coolant is equal to or more than a first prescribed temperature and an opening degree of the flow dividing valve makes the flow rate of the coolant flowing into the radiator equal to or more than a prescribed flow rate, gives a priority to the rise in a driving voltage of the fan over the increase in the flow rate by the water pump, and when a second prescribed period elapses in a state where the temperature of the coolant is equal to or more than a second prescribed temperature after the driving voltage of the fan is raised, increases the flow rate by the water pump.

The controller may raise the driving voltage of the fan stepwise. Moreover, the controller may raise the driving voltage of the fan stepwise by raising the first prescribed temperature stepwise. The controller may continue raising the driving voltage of the fan until the temperature of the coolant is equal to or less than a third prescribed temperature. The first prescribed period and the second prescribed period may be longer than a period in which the coolant cooled with the radiator circulates once.

When the temperature of the coolant is less than the first prescribed temperature, the controller may calculates a heating value of the fuel cell, when the heating value is equal to or less than a predetermined threshold value, the controller may stop the operation of the water pump, the fan and the flow dividing valve, and then acquire an integrated value of the heating value of the fuel cell, and when the integrated value of the heating value is equal to or more than a predetermined threshold value, the controller may activate the water pump, the fan and the flow dividing valve. In this case, the controller may drive the water pump with a minimum flow rate of the water pump.

When a third prescribed period elapses in a state where the temperature of the coolant is equal to or more than a fourth prescribed temperature after the controller increases the opening degree of the flow dividing valve up to a prescribed value, the controller may drive the fan. In this case, the controller may drive the fan with a minimum driving voltage.

BRIEF DESCRIPTION OF THE DRAWINGS

FIG. 6 is a graph illustrating an example of a driving line for the cooling system actuators when a vehicle in which the fuel cell system according to the embodiment is installed runs at 40 km/h.

DESCRIPTION OF EMBODIMENTS

Figure 1:
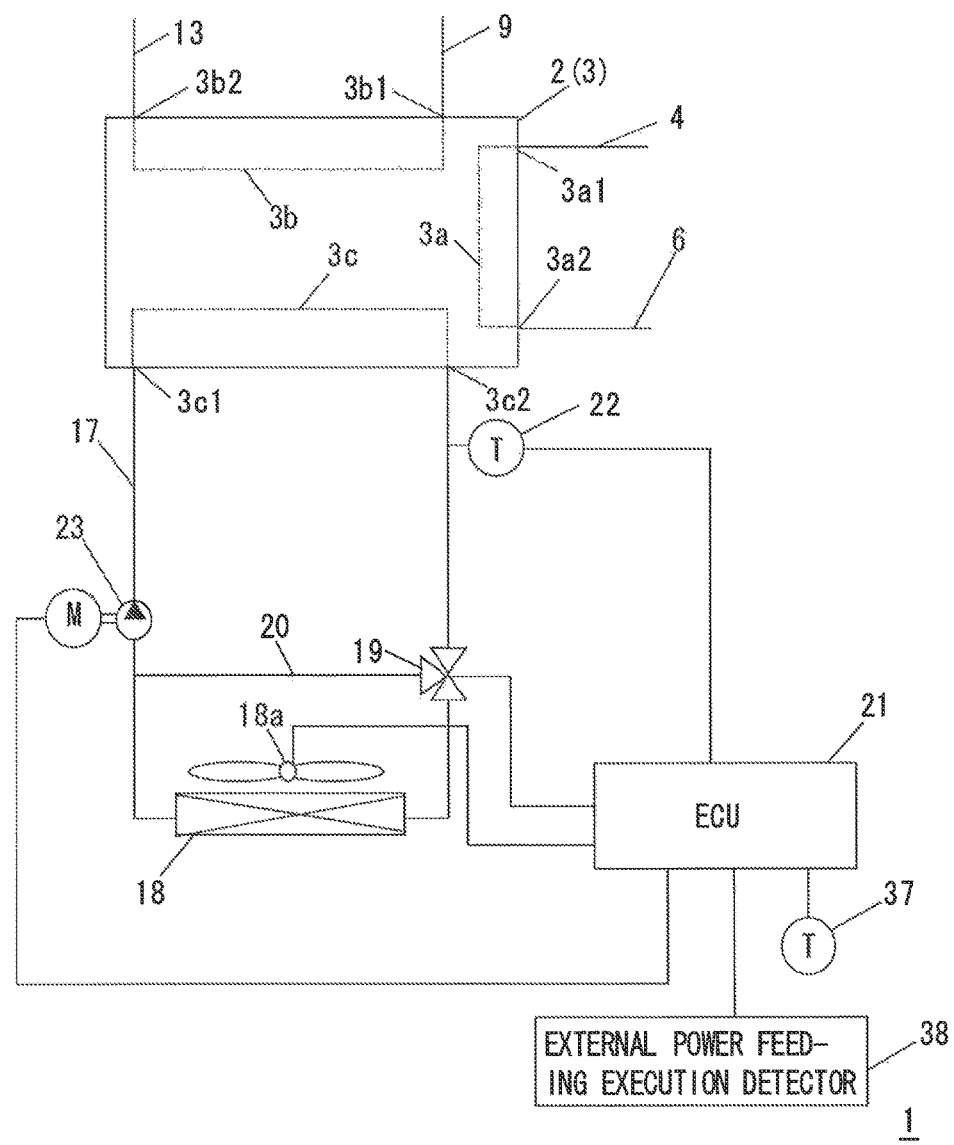
FIG. 1 is an explanatory view illustrating a schematic structure of a part of a fuel cell system according to an embodiment.

An embodiment according to the present invention will be described with reference to the accompanying drawings. However, a dimension and a ratio of each component illustrated in the drawings may not correspond to the reality.

Embodiment

First, a description will be given of a fuel cell system 1 according to an embodiment with reference to FIG. 1. FIG. 1 is an explanatory view illustrating schematic structure of a part of a fuel cell system 1 according to the embodiment. Incidentally, FIG. 1 illustrates the part of the fuel cell system 1, specifically, around the fuel cell stack 3 and a coolant circulation passage 17. For this reason, elements to be described later will not be illustrated in FIG. 1. The fuel cell system 1 can be installed in stationary powers besides various movable objects such as vehicles, ships, airplanes, and robots. Here will be described the fuel cell system 1 installed in an automobile as an example. The fuel cell system 1 includes a solid polymer fuel cell 2. The fuel cell 2 includes a fuel cell stack 3 formed by stacking single cells each having a cathode electrode, an anode electrode, and an electrolyte membrane disposed therebetween. An cathode channel 3*a* and an anode channel 3*b* are formed inside the fuel cell stack 3. The electrolyte membrane is, for example, a proton conducting solid polymer electrolyte membrane. Additionally, illustration of the single cell is omitted in FIG. 1. Moreover, the fuel cell stack 3 is provided within a coolant channel 3*c* through which coolant to cool the fuel cell stack 3 flows. In the fuel cell stack 3, the anode electrode is supplied with a hydrogen gas, namely, an anode gas. The cathode electrode is supplied with air containing oxygen, namely, a cathode gas. Hydrogen ions, generated by catalytic reaction in the anode electrode, move to the cathode electrode through the electrolyte membrane to electrochemically react to oxygen, which generates electricity. The fuel cell stack 3 is connected to a voltage meter for measuring a voltage value and a current meter for measuring a current value of the generated electricity. The coolant flowing through the coolant channel 3*c* cools the fuel cell stack 3. The fuel cell 2 can be used for the external power feeding as described above.

An inlet of the fuel cell stack 3, specifically, an inlet 3*a*1 side of the cathode channel 3*a* of the fuel cell stack 3 is connected to a cathode gas supply passage 4. An air cleaner is mounted at an end of the cathode gas supply passage 4. Further, on the cathode gas supply passage 4, a compressor is arranged for pumping and supplying the cathode gas to the fuel cell stack 3. On the cathode gas supply passage 4, the pressure regulating valve is arranged for regulating the pressure between an outlet of the compressor and the inlet 3*a*1 of the fuel cell stack 3.

An outlet 3*a*2 side of the cathode channel 3*a* of the fuel cell stack 3 is connected to a cathode off-gas discharge passage 6. On the cathode off-gas discharge passage 6, a backpressure valve is arranged. The backpressure valve regulates a pressure of a domain in the downstream side of the compressor on the cathode gas supply passage 4, in the cathode channel 3*a*, and in the upstream side of and the backpressure valve on the cathode off-gas discharge passage 6, that is, regulates a cathode backpressure. On the cathode off-gas discharge passage 6, a muffler is arranged on the downstream side of the backpressure valve.

An inlet 3*b*1 side of the anode channel 3*b* of the fuel cell stack 3 is connected to an anode supply passage 9. A hydrogen tank serving as a hydrogen supply source is connected to the end of the anode supply passage 9. In the hydrogen tank, high-pressure hydrogen is stored. On the anode supply passage 9, a shutoff valve is arranged for shutting off the supply of hydrogen, and a regulator is arranged for reducing the pressure of the hydrogen. An exhaust pipe 13 is connected to an outlet 3*b*2 side of the anode channel 3*b* of the fuel cell stack 3. On the end of the exhaust pipe 13, a gas-liquid separator is arranged. At the gas-liquid separator, the circulation passage and a purge passage are branched off. In the gas-liquid separator, water contained in the anode off-gas is separated. The anode off-gas separated from the water is discharged into the circulation passage. In contrast, the separated water is discharged into the purge passage. On the circulation passage, a pump is arranged. The arrangement of the pump on the circulation passage can supply the anode off-gas to the anode channel 3*b* again. The purge passage branched at the gas-liquid separator is connected to the downstream side of the backpressure valve provided on the cathode off-gas discharge passage 6. On the purge passage, a purge valve is arranged. By opening the purge valve, the anode off-gas not to be circulated can be discharged together with the cathode off.

An inlet 3*c*1 of the coolant channel 3*c* of the fuel cell stack 3 is connected to an end of the coolant circulation passage 17. Further, the other end of the coolant circulation passage 17 is connected to an outlet 3*c*2 of the coolant channel 3*c*. On the coolant circulation passage 17, a water pump (hereinafter referred to as "W/P") 23 is arranged for circulating the coolant and supplying the coolant to the fuel cell stack 3. Further, on the coolant circulation passage 17, a radiator 18 is arranged. The radiator 18 includes a fan 18*a*. When the fan 18*a* is driven, the air is sent towards the radiator 18. On the coolant circulation passage 17, a rotary valve (hereinafter referred to as "R/V") 19 is arranged as an example of a flow dividing valve. A bypass flow passage 20 bypassing the radiator 18 is branched from the R/V 19. The R/V 19 is an electrical three-way valve, and is electrically connected to an ECU (Electronic Control Unit) 21 which functions as a controller. The R/V 19 changes an opening degree of the R/V 19 depending on a temperature of the coolant (hereinafter referred to as "FC water temperature"), and controls a flow rate of the coolant flowing through the radiator 18. The coolant which flows into the radiator 18 is cooled in the radiator 18. At this time, when the flan 18*a* is driven and the air is sent to the radiator 18, a cooling efficiency improves. As the R/V 19 increases the opening degree, the R/V 19 increases an amount of the coolant to be flowed into the radiator 18 side. In the vicinity of the outlet 3*c*2 of the coolant channel 3*c*, a temperature sensor 22 is arranged for acquiring the FC water temperature. The temperature sensor 22, the W/P 23 and the fan 18*a* are also electrically connected to the ECU 21.

The fuel cell system 1, includes the ECU (Electronic Control Unit) 21. The ECU 21 is composed of a microprocessor provided with a CPU, a ROM and a RAM, and functions as the controller. The ECU 21 is electrically connected to the temperature sensor 22 and so on, as described above, and electrically connected to an outside air temperature sensor 37 measuring an outside air temperature. Moreover, the ECU 21 is electrically connected to an external power feeding execution detector 38 which detects that the external power feeding is performed. The ECU 21 stores a current-voltage map, or the like. Such the ECU 21 performs an output setting process of the fuel cell system 1. That is, the ECU 21 sets an air supply amount, the cathode backpressure, a hydrogen supply amount, a hydrogen pressure, a voltage, and a current value to be outputted from a current value map. The ECU 21 performs a cooling control of the fuel cell 2 at the time of the external power feeding, based on the measurement values of the temperature sensor 22 and the outside air temperature sensor 37, a heating value calculated from the voltage and the current at each time, and so on. The fan 18*a*, the R/V 19 and the W/P 23 are used for the cooling control of the fuel cell 2 at the time of the external power feeding. It should be noted that the fan 18*a*, the R/V 19 and the W/P 23 may be referred to as cooling system actuators in the following description.

Figure 2A:
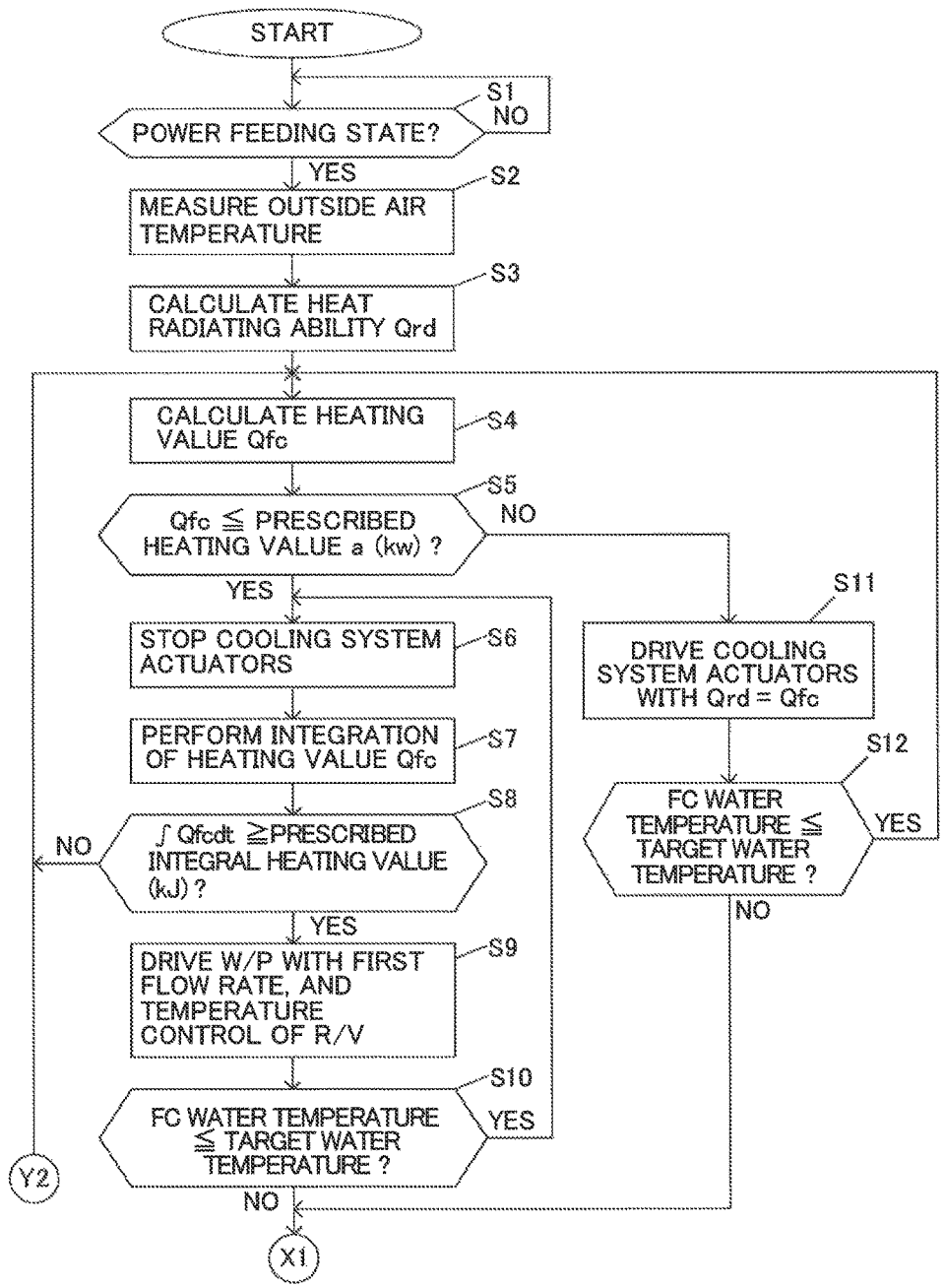
FIGS. 2A and 2B are a flowchart illustrating an example of the control of the fuel cell system according to the embodiment.
Figure 2B:
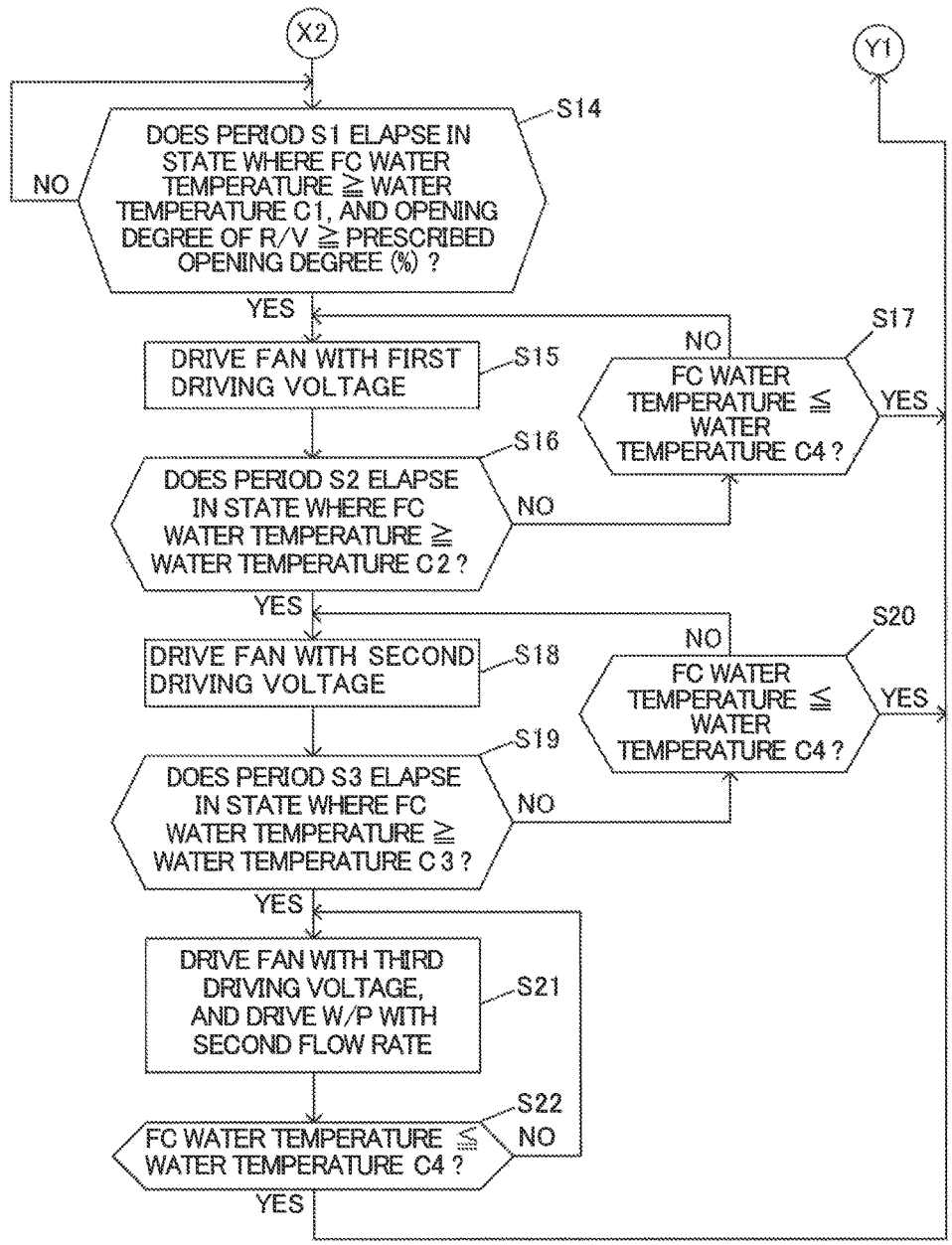
Figure 3:
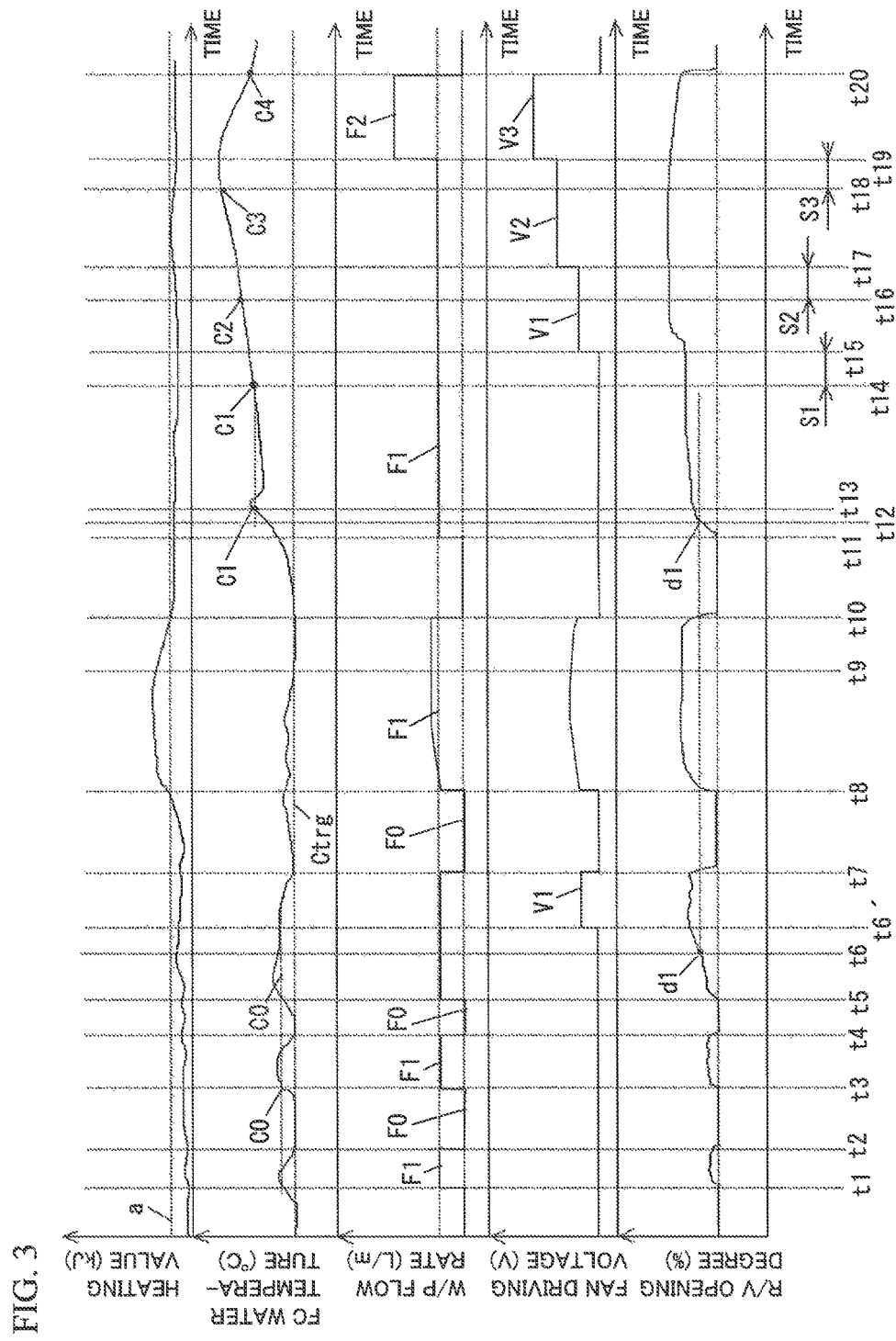
FIG. 3 is a time chart illustrating an example of an operating status of the fuel cell system according to the embodiment.
Figure 4:
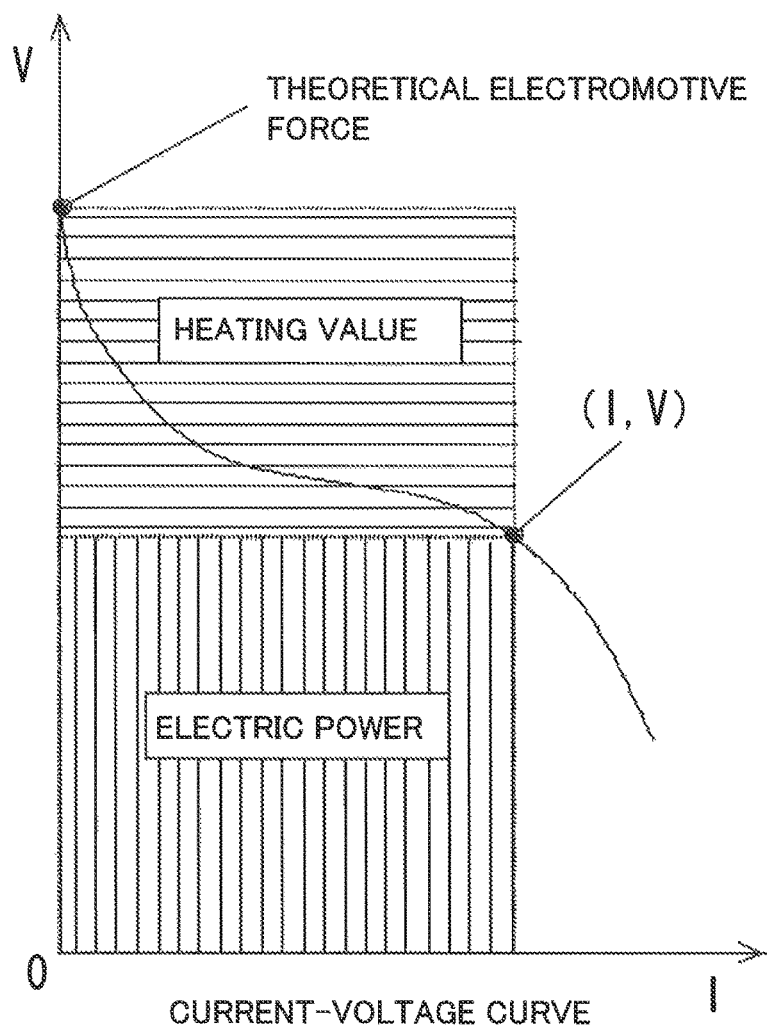
FIG. 4 is a graph illustrating a current-voltage curve of a fuel cell according to the embodiment.
Figure 5:
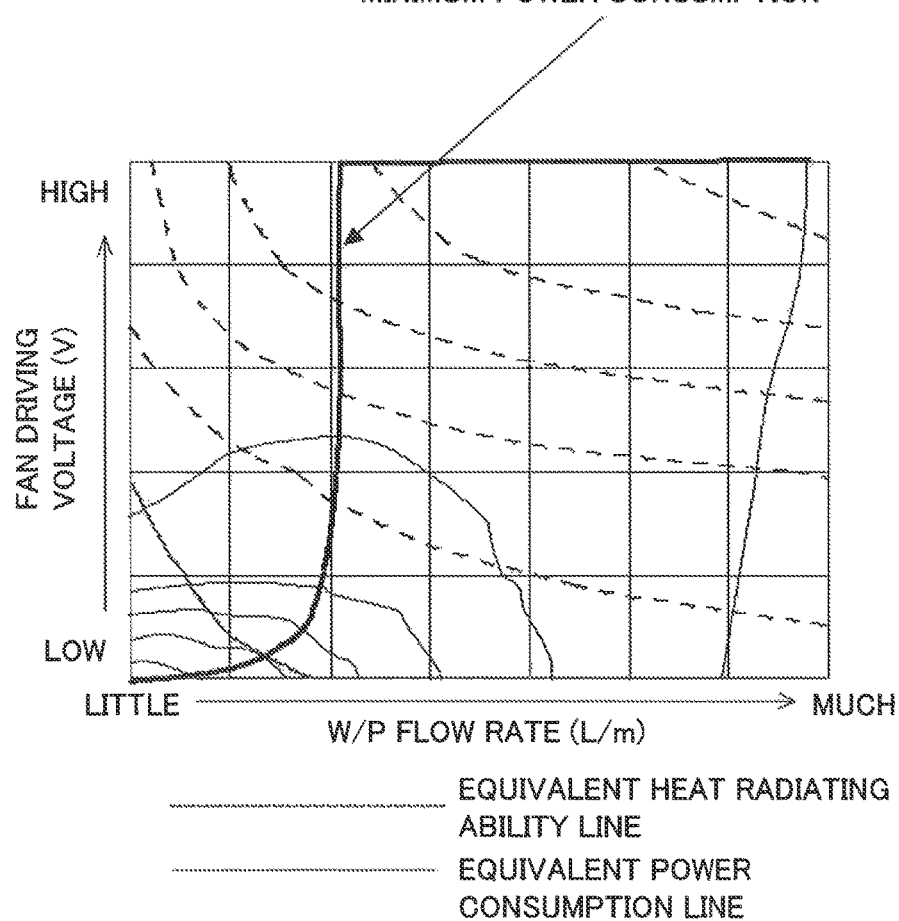
FIG. 5 is a graph illustrating an example of a driving line for cooling system actuators when the fuel cell system according to the embodiment is in a power feeding state.

Next, a description will be given of the control of the fuel cell system 1 according to the embodiment, with reference to FIGS. 2 to 6. FIGS. 2A and 2B are a flowchart illustrating an example of the control of the fuel cell system 1 according to the embodiment. FIG. 3 is a time chart illustrating an example of an operating status of the fuel cell system 1 according to the embodiment. FIG. 4 is a graph illustrating a current-voltage curve of the fuel cell according to the embodiment. FIG. 5 is a graph illustrating an example of a driving line for the cooling system actuators when the fuel cell system 1 according to the embodiment is in a power feeding state. FIG. 6 is a graph illustrating an example of a driving line for the cooling system actuators when a vehicle in which the fuel cell system 1 according to the embodiment is installed runs at 40 km/h. The control of the fuel cell system 1 is independently performed by the ECU 21. The changes in the FC water temperature and the changes in the heating value in the time chart illustrated in FIG. 3 are only one example. Therefore, an operation sequence of the fan 18a, the R/V 19 and the W/P 23 is also not limited to this. In an example of the time chart illustrated in FIG. 3, the contents of the control are changed according to whether the FC water temperature is equal to or more than a water temperature C1 as a first prescribed temperature value. Specifically, the contents of steps S1 to S12 of FIG. 2A illustrate a control of a case where the PC water temperature is less than the water temperature C1. Although the flow-chart illustrated in FIGS. 2A and 2B is divided into two portions for convenience of explanation, a mark X1 in FIG. 2A is connected to a mark X2 of FIG. 2B and a mark Y1 in FIG. 2B is connected to a mark Y2 of FIG. 2A.

First, in step S1, the ECU 21 judges whether the fuel cell 2 is in a power feeding state. The ECU 21 performs the judgment according to a signal from the external power feeding execution detector 38. When the answer to the judgment of step S1 is NO, the process of step S1 is repeated. When the answer to the judgment of step S1 is YES, the procedure advances to step S2. In step S2, the outside air temperature sensor 37 measures the outside air temperature. In step S3 executed subsequent to step S2, the ECU 21 calculates a heat radiating ability Qrd at the time. Specifically, the ECU 21 calculates the heat radiating ability Qrd based on a combination of a driving state of the fan 18a, the opening degree of the R/V 19 and a driving state of the W/P 23, and the outside air temperature measured at the time by the outside air temperature sensor 37. The reason why the ECU 21 refers to the combination of the driving state of the fan 18a, the opening degree of the R/V 19 and the driving state of the W/P 23 in order to calculate the heat radiating ability Qrd is that a heat transfer amount by the coolant is decided by the combination. Moreover, the reason why the ECU 21 refers to the outside air temperature is that the cooling efficiency improves by a low part when the outside air temperature is low, and adversely the cooling efficiency reduces by a high part when the outside air temperature is high.

In step S4 executed subsequent to step S3, the ECU 21 calculates a heating value Qfe of the fuel cell 2 at the time. The heating value Qfc is calculated from values of the current and the voltage which the fuel cell 2 generates at the time. Referring to the current-voltage curve illustrated in FIG. 4, a size of a domain surrounded with a point (I,V) at the time and an original point 0 indicates the electric power, and a size of a domain surrounded with the point (I,V) at the time and a theoretical electromotive force indicates the heating value Qfc. The theoretical electromotive three becomes a value decided by the fuel cell 2. For this reason, the ECU 21 can calculate the heating value Qfc at the time. Thus, after the heating value Qfc is calculated, the procedure advances to step S5.

In step S5, the ECU 21 judges whether the heating value Qfc is equal to or less than a prescribed heating value a (kw). The prescribed heating value a is a threshold value for changing control contents of the cooling system actuators in which the fan 18a, the R/V 19 and the W/P 23 are included. That is, when the heating value Qfc is equal to or less than the prescribed heating value a that is the threshold value, the heating value of the fuel cell 2 is in a small state, and the cooling system actuators are actuated according to the heating value of the fuel cell 2. Specifically, the ECU 21 stops the cooling system actuators once, and then actuates the cooling system actuators intermittently depending on the situation. In the fuel cell 2 during the external power feeding, a required electric power is small compared with a case where the vehicle in which the fuel cell system 1 is installed runs, and the heating value Qfc is also small depending on this electric power. For this reason, the ECU 21 actuates the cooling system actuators intermittently to suppress power consumption. When the answer to the judgment of step S5 is YES, the procedure advances to step S6.

In step S6, the ECU 21 once stops the cooling system actuators, i.e., the fan 18a, the R/V 19 and the W/P23. Then, the procedure advances to step S7. In step S7, the ECU 21 performs integration of the heating value Qfc. Even if a state where the heating value Qfc is equal to or less than the prescribed heating value a continues, heat gradually piles up and the temperature of the fuel cell 2 rises. Referring to a time chart illustrated in FIG. 3, until time t1, the R/V opening degree is 0%, the driving voltage of the fan 18a is 0V, and the flow rate of the W/P 23 is 0 L/m. For this reason, the rise in the FC water temperature is observed from a time immediately before the time t1. This is caused by the integration of the heating value Qfc. Here, a target water temperature Ctrg is set to the FC water temperature. The target water temperature Ctrg becomes a judgmental reference value when it is judged that the FC water temperature lowers and the cooling system actuators are stopped again.

In step S8 executed subsequent to step S7, the ECU 21 judges whether a time integral value of the heating value Qfc, i.e., ∫ Qfcdt becomes equal to or more than a prescribed integral heating value (kJ). The prescribed integral heating value (kJ) becomes a threshold value for actuating the W/P 23 and the R/V 19. When the answer to the judgment of step S8 is NO, the processes from step S4 are repeated. On the other hand, when the answer to the judgment of step S8 is YES, the procedure advances to step S9. In step S9, the W/P 23 is driven at a first flow rate F1 and a temperature control is executed by the R/V 19. Referring to FIG. 3, the timings when the process of step S9 is executed are the time t1, a time t3, a time t5 and a time t11. The FC water temperatures at these timings are in states lower than the water temperature C1. Here, the first flow rate F1 of the W/P 23 needs to be equal to or more than a minimum flow rate of the W/P 23, and is set to the minimum flow rate of the W/P 23 in the present embodiment. The minimum flow rate is decided by the specification of the W/P 23. When the first flow rate F1 of the W/P 23 is less than the minimum flow rate, the circulation of the coolant in the fuel cell system 1 cannot be achieved by the W/P 23. For this reason, the W/P 23 is driven with the first flow rate F1, so that the power consumption can be suppressed and the coolant can be circulated. When the coolant can be circulated, the fuel cell 2 can be cooled. On the other hand, the R/V 19 gradually increases the opening degree and increases an amount of the coolant flowing into the radiator 18. When the flow rate of the coolant flowing into the radiator 18 is increased, a cooling effect of the coolant becomes large. Here, at this time, it is assumed that the fan 18a is kept in a stopping state. The power consumption in the driving of the fan 18a is large. Therefore, in the timing when the temperature of the coolant is not so high, only the driving of the W/P 23 and the R/V 19 with a low power consumption in comparison with the driving of the fan 18a is performed. When a prescribed time elapses in a state where the FC water temperature is equal to or more than a temperature C0 although the opening degree of the R/V 19 reaches a prescribed value, concretely, a prescribed opening degree d1 like the timing of a time t6, the ECU 21 drives the fan 18a. That is, when the prescribed time elapses from the time t6 and the time is a time t6', the ECU 21 drives the fan 18a. Here, the prescribed opening degree d1 is a value that can be decided by the specification of the fuel cell system 1 as a threshold value for starting the driving of the fan 18a. For example, the prescribed opening degree d1 can be set to 50%. At this time, the fan 18a needs to be driven with a minimum driving voltage V1 or more. In the present embodiment, the driving voltage is set to the minimum driving voltage V1. The minimum driving voltage V1 is decided by the specification of the fan 18a. When the driving voltage is less than the minimum driving voltage V1, the fan 18a in the fuel cell system 1 cannot be activated. For this reason, when the FC water temperature can be lowered to the target water temperature Ctrg at a time t7 by not only activating the W/P 23 and the R/V 19 but also driving the fan 18a, the ECU 21 stops all the cooling system actuators again. Here, the temperature C0 corresponds to a fourth prescribed temperature and is higher than the target water temperature Ctrg. Although the temperature C0 in the present embodiment is set lower than the temperature C1, the temperature C0 may be equal to the temperature C1. Here, a period from the time t6 to the time t6' corresponds to a third prescribed period.

After the W/P 23 and the R/V 19 are activated in step S9, the procedure advances to step S10. In step 10, the ECU 21 judges whether the FC water temperature is equal to or less than the target water temperature Ctrg. Referring to FIG. 3, at the time t2 and the time t4, the FC water temperature is equal to or less than the target water temperature Ctrg. In the timings of the time t2 and the time t4, the answer to the judgment of step S10 is YES, and the processes from step S6 are repeated. That is, the ECU 21 stops the cooling system actuators again, performs integration of the heating value Qfc again from that time, and performs the processes up to step S10. On the other hand, when the answer to the judgment of step S10 is NO, the procedure advances to step S14 described later in detail.

When the answer to the judgment of step S5 is NO, i.e., the heating value Qfc is more than the prescribed heating value a (kw), the procedure advances to step S11. In step S11, the ECU 21 drives the cooling system actuators so that the heat radiating ability Qrd is equal to the heating value Qfc. When the heating value Qfc exceeds the prescribed heating value a (kw), it is assumed that the cooling ability is not enough by the intermittent driving of the cooling system actuators performed in steps S6 to S10. Therefore, the ECU 21 lowers the FC water temperature by not only actuating the W/P 23 and the R/V 19 but also driving the fan 18a. At this time, an upper limit of the ability of each of the cooling system actuators is not provided in order to get the heat radiating ability Qrd equal to the heating value Qfc. That is, the W/P 23 may be driven with a flow rate equal to or more than the first floa rate F1, and the fan 18a may be driven with a voltage equal to or more than the first driving voltage V1. In step S11, the driving of the cooling system actuators, and then the procedure advances to step S12. In step S12, the ECU 21 judges whether the FC water temperature is equal to or less than the target water temperature Ctrg. Referring to FIG. 3, at a time t9, the FC water temperature is equal to or less than the target water temperature Ctrg. In the timing of such time t9, the answer to the judgment of step S12 is YES, and the processes from step S4 are repeated. Then, in the timing of a time t10, when the answer to the judgment of step S5 is YES again, the ECU 21 stops the cooling system actuators. When the answer to the judgment of step S5 is NO again, the processes from step S11 are repeated. On the other hand, when the answer to the judgment of step S12 is NO, the procedure advances to step S14 described later in detail.

When the FC water temperature is not equal to or less than the target water temperature Ctrg even though the processes of steps S6 to S9 or the process of step S11 are performed, i.e., when the answer to the judgment of step S10 or S12 is NO, the procedure advances to step S14. In step S14, the ECU 21 judges whether a period S elapses in a state where the FC water temperature is equal to or more than the water temperature C1 and the opening degree of the R/V 19 is equal to or more than the prescribed opening degree d1 (%). Here, the water temperature C1 is a prescribed value. Referring to FIG. 3, in the timings of a time t13 and a time t14, the FC water temperature is equal to or more than the water temperature C1. The water temperature C1 corresponds to a first prescribed temperature. The opening degree of the R/V 19 is set in view of whether the flow rate of the coolant flowing into the radiator 18 is equal to or more than a prescribed flow rate. Here, the opening degree of the R/V 19 is set to the above-mentioned opening degree d1, but may be set to other opening degree. In the time chart illustrated in FIG. 3, the opening degree of the R/V 19 is equal to or more than the prescribed opening degree d1, in the timing of a time t12. In the timing of the time t11, the W/P 23 is driven with the first flow rate F1 and the opening degree control of the R/V 19 is started. These are processes based on step S9. That is, FIG. 3 illustrates a situation where the FC water temperature continues rising although the process of step S9 is performed at the time t11. In such a situation, when the FC water temperature exceeds the first prescribed water temperature C1 and the prescribed condition is satisfied, processes after step S14 are performed.

Here, the period S1 in step S14 is explained. The period S1 corresponds to a first prescribed period. The period S1 is an elapsed time after the FC water temperature reaches the water temperature C1 and the opening degree of the R/V 19 becomes equal to or more than the opening degree d1. Referring to FIG. 3, in the timing of the time t13, the FC water temperature becomes a state equal to or more than the water temperature C1 once, but immediately returns to a state lower than the water temperature C1. For this reason, the period S1 does not elapse. In this case, the answer to the judgment of step S14 is NO. When the answer to the judgment of step S14 is NO, the process of step S14 is repeated. On the other hand, when the FC water temperature is equal to or more than the water temperature C1, the FC water temperature continuously rises, and the period S1 elapses in the timing of a time t15. Therefore, in the timing of the time t15, the answer to the judgment of step S14 is YES. Here, the first prescribed period is set longer than a period in which the coolant cooled with the radiator 18 circulates once. This is because, if the coolant can circulate in the coolant circulation passage 17 once, the coolant passes through an installation location of the temperature sensor 22 and the ECU 21 can understand a state inside the passage.

When the answer to the judgment of step S14 is YES, the procedure advances to step S15. In step S15, the ECU 21 drives the fan 18a with the first driving voltage V1. That is, the ECU 21 gives a priority to the rise in the driving voltage of the fan 18a over the increase in the flow rate by the W/P 23. At this time, unlike the driving voltage of the fan 18a in step S11 not being lowered to the first driving voltage V1, the fan 18a first is driven with the first driving voltage V1. Here, a description will be given of a reason for giving the priority to the rise in the driving voltage of the fan 18a over the increase in the flow rate by the W/P 23 in this way; with reference to FIGS. 5 and 6.

Referring to FIG. 5, the flow rate (L/m) of the W/P 23 is depicted as a horizontal axis, and the driving voltage of the fan 18a is depicted as a vertical axis. Chain lines depicted in FIG. 5 are equivalent heat radiating ability lines, and thin solid lines depicted in FIG. 5 are equivalent power consumption lines. That is, by tracing each one of the equivalent heat radiating ability lines in FIG. 5, understood are combinations of the flow rate of the W/P 23 and the driving voltage of the fan 18a which can secure an equivalent heat radiating ability. Moreover, by tracing each one of the equivalent power consumption lines in FIG. 5, understood are combinations of the flow rate of the W/P 23 and the driving voltage of the fan 18a which are equivalent in the power consumption. Points of the combinations in which the power consumption becomes minimum on each of the equivalent heat radiating ability lines are plotted using such the equivalent heat radiating ability lines and the equivalent power consumption lines, so that a line depicted by a thick solid line in FIG. 5 can be acquired. That is, the thick solid line is a driving line for the cooling system actuators that secures the heat radiating ability and achieves a minimum power consumption. Also in FIG. 6, the same thick solid line is depicted. Here, when the thick solid line of FIG. 5 is compared with that of FIG. 6, the thick solid line of FIG. 5 indicating the power feeding state stands up almost perpendicularly. This indicates that, since there is no vehicle speed wind during the power feeding, i.e., during parking, the improvement of the ability of the fan 18a leads to the increase of the heat radiating ability, and the efficiency of the power consumption by the improvement of the heat radiating ability. Therefore, in step S15 of the present embodiment, the ECU 21 gives the priority to the rise in the driving voltage of the fan 18a over the increase in the flow rate by the W/P 23. Here, in the present embodiment, the ECU 21 gradually raises the driving voltage of the fan 18a, but drives the fan 18a with the first driving voltage V1 in the timing of the time t15. The first driving voltage V1 is the same value as the minimum driving voltage V1.

Although the ECU 21 starts the driving of the fan 18a in the timing of the time t15, the ECU 21 increase the opening degree of the R/V 19 When the ECU 21 raises the driving voltage of the fan 18a and then a prescribed period elapses in a state where the temperature of the coolant is equal to or more than a prescribed temperature (C1). Specifically, the ECU 21 increase the opening degree of the R/V 19 between the time t15 and the time t16 in FIG. 3 by one step. Thereby, the low rate of the coolant flowing into the radiator 18 is increased and the cooling efficiency is improved.

In step S16 executed subsequent to step S15, the ECU 21 judges whether a period S2 elapses in a state where the FC water temperature is equal to or more than a water temperature C2. Here, the water temperature C2 corresponds to the first prescribed temperature like the water temperature C1, and is higher than the water temperature C1. The water temperature C2 is a temperature in which the first prescribed temperature is raised stepwise. Instead of the water temperature C1, the water temperature C2 is set as the first prescribed temperature. The period S2 corresponds to the first prescribed period like the period S1. In the present embodiment, the period S2 uses a value different from the period S1, but may be the same value as the period S1. A reason for setting the period S2 is to eliminate a case where the FC water temperature only exceeds the water temperature C2 instantaneously, for example. Referring to FIG. 3, the FC water temperature is equal to or more than the water temperature C2 in the timing of the time t16, and the period S2 elapses in the timing of a time t17. Therefore, the judgment of YES in step S16 is performed in the timing of the time t17. When the answer to the judgment of step S16 is NO, the procedure advances to step S17. In step S17, the ECU 21 judges whether the FC water temperature is equal to or less than a water temperature C4. The water temperature C4 is set to a value in which the ECU 21 can judge that the FC water temperature is cooled appropriately by a series of cooling control. The water temperature C4 corresponds to a third prescribed temperature. In the present embodiment, the water temperature C4 is set to a value lower than the water temperature C1. The water temperature C4 may have the same value as the water temperature Ctrg, or may have a value different from the water temperature Ctrg. When the answer to the judgment of step S17 is NO, the procedure returns to step S15, and the driving of the fan 18a with the first driving voltage V1 is continued. When the answer to the judgment of step S17 is YES, the procedure returns to step S4. On the other hand, when the answer to the judgment of step S16 is YES, the procedure advances to step S18.

In step S18, the ECU 21 drives the fan 18a with a second driving voltage V2 higher than the first driving voltage V1. Thus, the ECU 21 raises the driving voltage of the fan 18a stepwise, so that the power consumption by the fan 18a can be suppressed. Moreover, in this way, the FC water temperature to be referred by the ECU 21 is raised stepwise when the ECU 21 raises the driving voltage of the fan 18a stepwise, and hence the driving of the fan 18a with a low voltage can be continued as much as possible.

In step S19 executed subsequent to step S18, the ECU 21 judges whether a period S3 elapses in a state where the FC water temperature is equal to or more than a water temperature C3. Here, the water temperature C3 corresponds to a second prescribed temperature, and is set to a value higher than the water temperature C2 in the present embodiment. The period S3 corresponds to a second prescribed period. In the present embodiment, the period S3 uses a value different from the period S1, but may be the same value as the period S1. A reason for setting the period S3 is to eliminate a case where the FC water temperature only exceeds the water temperature C3 instantaneously; for example. Referring to FIG. 3, the FC water temperature is equal to or more than the water temperature C3 in the timing of a time t18, and the period S3 elapses in the timing of a time t19. Therefore, the judgment of YES in step S19 is performed in the timing of the time t19. When the answer to the judgment of step S19 is NO, the procedure advances to step S20. In step S20, the ECU 21 judges whether the FC water temperature is equal to or less than the water temperature C4. The water temperature C4 is set to the value in which the ECU 21 can judge that the FC water temperature is cooled appropriately by a series of cooling control. When the answer to the judgment of step S20 is NO, the procedure returns to step S18, and the driving of the fan 18a with the second driving voltage V2 is continued. When the answer to the judgment of step S20 is YES, the procedure returns to step S4. On the other hand, when the answer to the judgment of step S19 is YES, the procedure advances to step S21. Here, the second prescribed period and the second prescribed temperature are threshold values for increasing the flow rate of the W/P 23. Instead of the period S3 and the water temperature C3, other values may be used as the second prescribed period and the second prescribed temperature. For example, the water temperature C1 may be set as the second prescribed temperature, and an elapsed period from the time t14 in which the FC water temperature exceeds the water temperature C1 in the flowchart illustrated in FIG. 3 may be set as the second prescribed period. That is, in a state where the prescribed temperature is continuously maintained, the timing increasing the flow rate of the W/P 23 needs to become a timing subsequent to the rise of the driving voltage of the fan 18a. Moreover, the second prescribed period needs to be set longer than a period in which the coolant cooled with the radiator 18 circulates once. This is because, if the coolant can circulate in the coolant circulation passage 17 once, the coolant passes through the installation location of the temperature sensor 22 and the ECU 21 can understand a state inside the passage.

In step S21, the ECU 21 drives the fan 18a with a third driving voltage V3 higher than the second driving voltage V2. Here, the third driving voltage V3 is a maximum driving voltage set to the fan 18a. Moreover, in step S21, the ECU 21 drives the W/P 23 with a second flow rate F2 more than the first flow rate F1. Here, the second flow rate F2 is a maximum flow rate set to the W/P 23. Thus, when the period S3 elapses in a state where the FC water temperature is equal to or more than the water temperature C3 after the driving voltage of the fan 18a is raised, the ECU 21 increases the flow rate of the W/P 23. When the FC water temperature is not cooled appropriately although various cooling controls are performed, the ECU 21 drives the fan 18a with the maximum driving voltage and sets the flow rate of the W/P 23 to the maximum flow rate. Moreover, at this time, the ECU 21 sets the opening degree of the R/V 19 to a maximum value to flow the coolant into the radiator 18 as much as possible. Thereby, the cooling ability of the fuel cell system 1 is improved. In step S22 executed subsequent to step S21, the ECU 21 judges whether the FC water temperature is equal to or less than the water temperature C4. When the answer to the judgment of step S22 is YES, the procedure returns to step S4. Referring to FIG. 3, the FC water temperature reaches the water temperature C4 in the timing of a time t20. Therefore, the judgment of YES in step S22 is performed in the timing of the time t20. On the other hand, when the answer to the judgment of step S22 is NO, the procedure returns to step S21, and the ECU 21 continues the driving of the fan 18a with the third driving voltage V3 and the driving of the W/P 23 with the second flow rate F2.

As described above, the control of the fuel cell system 1 can effectively cool the fuel cell 2 performing the external power feeding.

While the exemplary embodiments of the present invention have been illustrated in detail, the present invention is not limited to the above-mentioned embodiments, and other embodiments, variations and modifications may be made without departing from the scope of the present invention.

What is claimed is:

1. A fuel cell system comprising:
   a fuel cell that is mounted on an automobile and performs an external power feeding to an electrical appliance that is not mounted on the automobile;
   a coolant circulation passage through which a coolant cooling the fuel cell circulates;
   a radiator mounted on the coolant circulation passage;
   a water pump that circulates a coolant in the coolant circulation passage;
   a flow dividing valve that controls a flow rate of the coolant flowing through the radiator;
   a fan that sends an air to the radiator; and
   a controller that is programmed to:
   determine whether or not the fuel cell is in an external power feeding state,
   give a priority to a rise in a driving voltage of the fan over the increase in the flow rate by the water pump, when the fuel cell is in the external power feeding state, when a first prescribed period elapses in a state where a temperature of the coolant is equal to or more than a first prescribed temperature, and when an opening degree of the flow dividing valve makes the flow rate of the coolant flowing into the radiator equal to or more than a prescribed flow rate, and
   increase the flow rate by the water pump, when a second prescribed period elapses in a state where the temperature of the coolant is equal to or more than a second prescribed temperature after the driving voltage of the fan is raised.

2. The fuel cell system as claimed in claim 1, wherein the controller is programmed to raise the driving voltage of the fan stepwise.

3. The fuel cell system as claimed in claim 2, wherein the controller is programmed to raise the driving voltage of the fan stepwise by raising the first prescribed temperature stepwise.

4. The fuel cell system as claimed in claim 1, wherein the controller is programmed to continue raising the driving voltage of the fan until the temperature of the coolant is equal to or less than a third prescribed temperature.

5. The fuel cell system as claimed in claim 1, wherein the first prescribed period and the second prescribed period are longer than a period in which the coolant cooled with the radiator circulates once.

6. The fuel cell system as claimed in claim 1, wherein when the temperature of the coolant is less than the first prescribed temperature, the controller calculates a heating value of the fuel cell,
when the heating value is equal to or less than a predetermined threshold value, the controller stops the operation of the water pump, the fan and the flow dividing valve, and then acquires an integrated value of the heating value of the fuel cell, and
when the integrated value of the heating value is equal to or more than a predetermined threshold value, the controller activates the water pump, the fan and the flow dividing valve.

7. The fuel cell system as claimed in claim 1, wherein when the temperature of the coolant is less than the first prescribed temperature, the controller calculates a heating value of the fuel cell,
when the heating value is equal to or less than a predetermined threshold value, the controller stops the operation of the water pump, the fan and the flow dividing valve, and then acquires an integrated value of the heating value of the fuel cell, and
when the integrated value of the heating value is equal to or more than a predetermined threshold value, the controller activates the water pump, the fan and the flow dividing valve, and the controller is programmed to drive the water pump with a minimum flow rate of the water pump.

8. The fuel cell system as claimed in claim 6, wherein when a third prescribed period elapses in a state where the temperature of the coolant is equal to or more than a fourth prescribed temperature after the controller increases the opening degree of the flow dividing valve up to a prescribed value, the controller is programmed to drive the fan.

9. The fuel cell system as claimed in claim 6, wherein when a third prescribed period elapses in a state where the temperature of the coolant is equal to or more than a fourth prescribed temperature after the controller increases the opening degree of the flow dividing valve up to a prescribed value, the controller is programmed to drive the fan with a minimum driving voltage.

* * * * *